Figure 1:
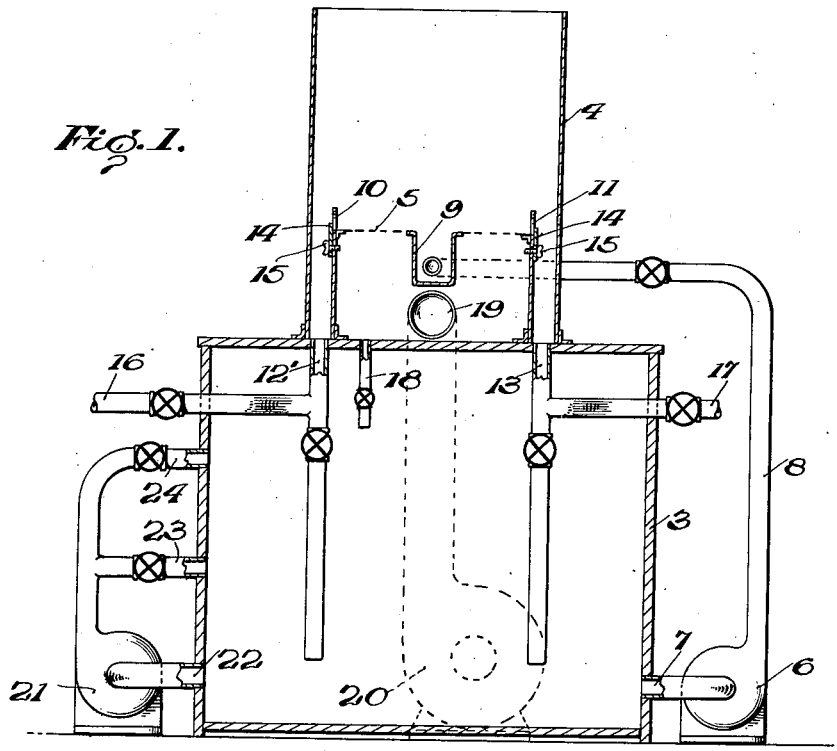

May 24, 1938. K. A. WESSBLAD ET AL 2,118,370

METHOD OF TREATING FERMENTING LIQUIDS

Filed May 13, 1936

Inventors
Karl Alexander Wessblad
Hans Elis Abraham Göth
Johan Olof Naucler
By Cameron, Kerkam & Sutton
Attorneys Patented May 24, 1938

2,118,370

UNITED STATES PATENT OFFICE 2,118,370

METHOD OF TREATING FERMENTING LIQUIDS

Karl Alexander Wessblad, Hans Elis Abraham Göth, and Johan Olof Naucler, Stockholm, Sweden, assignors to Industrikemiska Aktiebolaget, Stockholm, Sweden, a Swedish joint-stock company Application May 13, 1936, Serial No. 79,602
In Sweden January 30, 1932

15 Claims. (Cl. 195—95)

The present invention relates to methods for carrying out fermentation processes or the like in which the solution in which fermentation is to be excited is treated with air or some other oxygen-containing gas or gas mixture.

In known aeration processes, such as those for treating wort solutions in fermentation vessels, as they have been usually carried on in the past, the air or oxygen-containing gas is forced through the fermenting liquid as it lies contained in the fermentation vessel. Under this kind of aeration the fermenting liquid very often starts foaming so violently that special foam killers must be employed to keep the foaming within reasonable limits. The use of foam killers, generally low grade mineral oils or waste fats, which are practically fully consumed and not recoverable, makes the processes expensive, not only because the foam killing materials represent a large expense in themselves, but also because they increase the infection risk in the fermentation vessels. Furthermore, the pressure under which the air or gas has to be introduced is comparatively high, as a rule, on account of the resistance offered by the relatively great depth of the body of liquid in the fermentation vessel. This pressure often amounts to 0.3 or 0.4 atmosphere. In consequence thereof, the power consumption of these prior aeration processes is considerable.

The primary object of the invention is therefore to provide a method of treating fermenting liquids, such as wort solutions, mashes or the like, sewages and other liquids, with air or other oxygen-containing gases in such a way that very little or no addition of foam killers becomes necessary and that the power consumption is materially lower than in known aeration processes. The reduction in power consumption is attained both by aerating only a small portion of the main body of liquid at any one time and by minimizing as far as possible the emulsification of the liquid by withdrawing from the aerating apparatus independently of the aerated liquid all of the air or gas passed through the liquid except the relatively small quantity of oxygen which is taken up by the liquid during aeration.

The procedure of the invention may be briefly characterized as follows: The fermenting liquid or solution which is to be aerated is caused to flow from a fermentation vessel in variably determinable quantities over an aerating device, such as a strainer plate or perforated pipes, and then back to the fermentation vessel or to some other convenient reservoir. Air or a suitable gas is forced in finely divided streams into and through the quantity of liquid in the aerating device, the air or gas passing through the liquid being led off from said device independently of the liquid so as to prevent it from leaving the said device mixed together with the liquid. This process may be repeated as many times during the fermentation process as may be necessary. In accordance with this procedure, only a relatively very small quantity of small gas bubbles remains in the liquid in emulsified form, most of the oxygen having been assimilated by the fermenting particles. The result is that transportation and even continued circulation of the liquid by a pump or the like, until the intended amount of fermentation or growth of yeast has taken place, is materially facilitated because of the minimum amount of emulsion which is formed.

In a number of fermentation processes the need for oxygen varies at different times during the process in a manner such that at the beginning of the process the need for oxygen increases more or less rapidly reaching a maximum at a certain stage in the process, whereafter it again falls, often very rapidly. Consequently, a further object of the invention is to provide an improved aeration procedure by which the supply of oxygen is so regulated that at each moment during the process as much oxygen is supplied as is needed by the fermenting liquid.

Obviously, in practice, the need of oxygen is greatly influenced by the character of the final product which is to be manufactured by the process—for example, the manufacture of bread-yeast or beer-yeast would involve different conditions of oxygen supply than if the ultimate product were a refined liquid such as produced in the fermentation treatment of sewages, etc. In the following, the invention has been described in connection with bread-yeast manufacture, but it is to be clearly understood that the invention is not limited to the method and steps specific to this particular kind of fermentation but is equally capable of adaptation to other fermentation processes.

What may be held to be of universal application in all processes of the kind referred to, is the principle that oxygen is to be supplied to the solution with a minimum of power consumption. Power is consumed during fermentation processes partly by the delivery of solution to an aerating zone, and partly by the supply of air or gas to the solution in the aeration device. The quantity of liquid which is to be aerated, and consequently which has to be delivered to the aeration zone, per unit of time depends on the solubility of oxygen in the solution and on the oxygen consumption during fermentation. It is obvious that the amount of liquid which has to be aerated and consequently supplied to the aeration zone at each moment must be such that the quantity of oxygen taken up thereby is approximately the same as that consumed in the process at the same moment. Hence, the greater the quantity of oxygen taken up per kilogram of liquid, the greater the decrease that can be effected in the quantity of liquid which must be supplied. Optimum conditions will be reached when the oxygen in the liquid entering the aeration zone is at the minimum which may be considered allowable with respect to evenly continued fermentation. Assimilation of oxygen is thereby more likely to effect saturation of the liquid than accumulation of oxygen-containing gas bubbles around yeast particles, with the result that the adverse effect of emulsification of the liquid upon the capacity of the apparatus and the transportation of the liquid by means of pumps is greatly decreased or avoided.

In the case of bread-yeast production, the need for oxygen increases slowly from the beginning of the process until a maximum is reached near the end of the process, and thereafter falls rapidly. The wort supply to the aeration zone is regulated accordingly. Assuming that the whole process lasts twelve hours, the oxygen consumption would usually increase until the eleventh hour. Consequently the wort transport will be increased more or less uniformly, and the layer of wort within the aeration zone will become proportionately thicker so long as the velocity of flow of the wort through the zone remains unchanged or even is decreased. Whether it is preferable to increase the velocity of flow or to increase the thickness of the layer, or to chose a combination of these two methods, will be dependent to a high degree on given working conditions. In many cases it may be useful to keep the depth of the layer substantially constant so that the output of the air compressor delivering air to the aeration zone may be maintained constant, while the pump delivery is regulated so as to increase or decrease the quantity of wort passing through the aeration zone per unit of time in a manner such that the quantity of oxygen consumed is replaced by delivery of a sufficient quantity of fresh air. Another fact making it desirable to repeat the act of supplying oxygen to the liquid many times each minute (that is, a more rapid circulation of the liquid), is that it produces an improvement in the growth of yeast in the liquid and in the quality of the finally obtained product, particularly with respect to the consistency of the yeast.

The process of the present invention can be carried out in a very simple manner by passing a continuous stream of the liquid to be fermented from the fermentation vessel, through an aerating device and back to the fermentation vessel or to any other suitable reservoir, the aerating device being provided with an overflow or the like which is so constructed that the depth of the layer of liquid being aerated may be varied at will but is always maintained materially less than the depth of the main body of the liquid contained in the fermentation vessel. The depth of layer selected will, of course, vary dependent upon the working conditions obtaining at any given time. The aeration device may be arranged anywhere, in relation to the fermentation vessel, but is preferably disposed above the liquid level in the fermentation vessel so that the solution passing through the aeration device can be brought back to the fermentation vessel or other reservoir by gravity. When even in the present process the aerated solution contains a certain amount of very small emulsified air bubbles, and difficulties arise in pumping the same, these difficulties can be easily avoided by so arranging the apparatus that the return of the liquid to the fermentation or other vessel is gravitational.

The nourishment solution or nutrient broth, necessary for the formation and normal growth of yeast, or other fermentation product, can be introduced into the fermenting liquid at any stage of the process, but is preferably added either immediately after the aeration or at a point where active mixing takes place in the liquid; for example, at or immediately before the point where the pump line supplying the liquid enters the aeration device, or at the point where the pump draws the liquid out of the fermentation vessel for delivery to the aerating device.

The nature of the invention and still further objects thereof are more fully disclosed in the following description which is to be considered in conjunction with the accompanying drawing, the latter illustrating diagrammatically, and by way of example only, one embodiment of apparatus for carrying the invention into practical effect.

Figure 2:
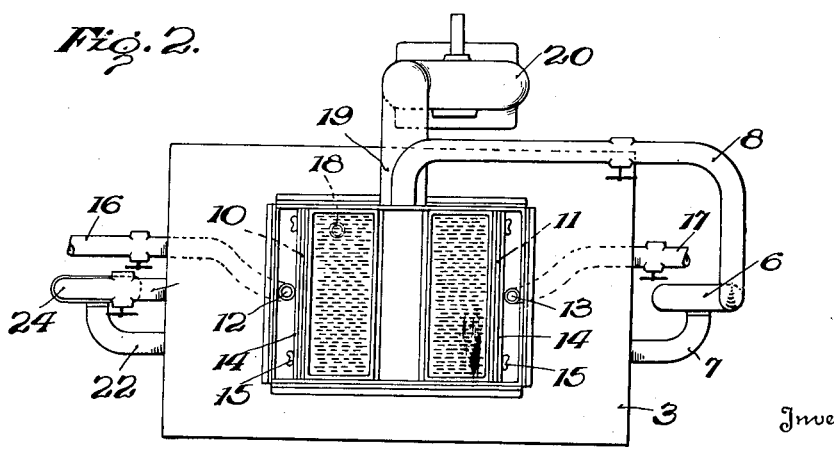

In this drawing, Fig. 1 is a diagrammatic elevation view, partly in section, of one form of apparatus adapted to be operated in accordance with the method described above, while Fig. 2 is a top view of the apparatus of Fig. 1, the reference numerals in Fig. 2 corresponding with those used in Fig. 1.

Referring now to the drawing, 3 is a reservoir adapted to contain the main body of a fermenting liquid such as wort solution, mash, sewage or the like, which may generally correspond to a fermentation vessel of the usual type, and 4 is a vessel provided with a perforated false bottom or strainer plate 5 which serves as the aerating device. The liquid in vessel 3 is supplied by a suitable pump 6 through pipes 7 and 8 to a distribution channel 9 in aerating vessel 4. From channel 9 the liquid flows over the perforated strainer plate 5 in a layer of adjustable depth to outlets 10 and 11 at the edges of the plate and thence to pipes 12 and 13. Each of outlets 10 and 11 is provided with an adjustable gate or dam member 14 the position of which may be adjusted in any suitable manner, as by wing screws 15, in order that the depth of the layer of liquid above plate 5 may be regulated as desired. It is to be expressly noted, however, that the depth of this liquid layer is always maintained at only a fraction of the depth of the main body of liquid in fermentation vessel 3.

The liquid flowing into pipes 12 and 13 is either returned thereby by gravity to fermentation vessel 3 or, by proper manipulation of the valves illustrated, diverted into pipes 16 and 17 which lead to some other convenient reservoir, as in the case of sewage treatment where a number of reservoirs and aeration devices may be arranged in series. A small, valve-controlled pipe 18 is also provided in the bottom of aerating vessel 4 to enable the return to fermentation vessel 3 of any liquid that may drip through the strainer plate 5.

The aerating vessel 4 is also provided with an intake pipe 19 to which air or other oxygen-containing gas is supplied under pressure by a suitable blower 20 and from which it is distributed under and forced to pass through the perforations of strainer plate 5 and the layer of liquid on top of said plate, the pressure of the air or gas thus supplied being relatively low as compared with that required in prior fermentation processes of this general character because of the relative shallowness of the layer of liquid maintained above said plate. In the embodiment illustrated, aeration vessel 4 is open at the top so that the air or gas which is forced through the liquid on top of plate 5 may pass out through the top of vessel 4 and not participate in the circulation of the aerated liquid. If desired, the top of vessel 4 may be closed and provided with a suction device for insuring rapid flow of the air through the liquid layer and out of the aerating vessel.

The fermentation vessel 3 may also be provided with a device for stirring the liquid or solution therein and keeping it in constant motion. For example, such a device might comprise a pump 21 having an intake pipe 22 communicating with the interior of vessel 3 adjacent the bottom thereof and a pair of return pipes 23 and 24 delivering the liquid back to vessel 3 at higher levels.

As pointed out above, the thickness or depth of the layer of liquid flowing across strainer plate 5 is relatively small, especially as compared to the depth of the main body of liquid in fermentation vessel 3, and can be fixed and regulated at discretion by adjustment of gate or dam members 14. With this arrangement, only a small portion of the fermenting liquid is being aerated at any one time, and the amount of liquid thus treated can be regulated as desired.

Another feature of the present invention resides in the establishment of a relationship between the thickness or depth of the liquid layer flowing across the strainer plate and the area of the perforations through which the air or gas is forced and placed in finely divided condition for passage through the liquid such that foam generation is markedly limited and power consumption considerably reduced in comparison with previously known aeration methods. It has been found that efficient operation can be obtained if the area of each of the respective holes of a strainer plate or a perforated pipe is 0.8 square millimeter or larger which, in the case of circular holes, is equivalent to a diameter of at least about 1 millimeter. Instead of a strainer plate, a slotted plate or pipe may be employed, in which case the width of the slots should be between about 0.5 and 6 millimeters. The depth or thickness of the liquid layer above the plate may be preferably maintained at 10 centimeters or less, although, depending upon the conditions prevailing during the fermentation process or during the process of growth of the yeast, it may be desirable to vary the depth between 2 and 20 centimeters. As previously pointed out, if the supply of air or other oxygen-containing gas through pipe 19 is maintained substantially constant during operation of the device, the depth of the liquid layer may be varied in accordance with the demand for oxygen which is in turn dependent upon the rate of yeast propagation or other fermentation. The variation in the ratio between the amount of air or gas supplied and the amount of liquid being aerated may also be effected by changing the speed of operation of either pump 6 or blower 20, or both. By operating in accordance with the invention, a power saving of from 50% to 90% can be attained as compared with the power consumption of similar processes hitherto known.

There is thus provided by the present invention a simple and efficient method for effecting aeration of fermenting liquids in such a way that foam generation is maintained at a minimum without requiring the addition of large amounts of foam killers. The method is characterized by the fact that only small quantities of the fermenting liquid are aerated at one time, but more frequently than in hitherto known processes, with the result that the power consumption of the procedure is materially lower than in hitherto known aeration methods. It will also be noted that emulsification of the liquid has been minimized by providing for the withdrawal or escape from the aerating apparatus independently of the aerated liquid of all of the air or gas passed through the liquid with the exception of the relatively small quantity of oxygen which is taken up by the liquid during aeration, an improvement which also materially facilitates circulation of the liquid by means of a pump or the like. By controlling the amount of liquid flowing through the aerating device per unit of time, or by maintaining said rate of flow constant and varying the speed of the blower by which the air or gas is forced through the liquid layer, it is also possible to vary the ratio between the amount of liquid being treated and the amount of air or gas supplied in direct relation to the need of the fermenting liquid for oxygen at the various stages of the fermentation process.

It will be obvious that the invention is not limited to the use of the particular apparatus shown in the drawing or to the specific procedural steps herein disclosed in detail. Various changes, which will now become apparent to those skilled in the art, may be made in the procedural steps of the method, or in the form, details of construction and arrangement of the parts of the apparatus, without departing from the spirit of the invention. Reference is therefore to be had to the appended claims for a definition of the limits of the invention.

This is a continuation in part of application Serial No. 654,016, filed January 28, 1933, issued April 20, 1937, as Patent No. 2,077,652.

What is claimed is:—

1. In a method of treating fermenting liquids, the steps of establishing a main body of fermenting liquid, continuously removing from said main body a small portion thereof, elevating the removed portion, forming said removed portion into a relatively thin layer of controllable depth, said depth being materially less than that of said main body, subjecting said layer to distributed air under a sufficient pressure to force the air through the layer in finely divided condition, whereby oxygen is taken up by the liquid from the air, removing the air that passes through said layer without its participation in the further movement of the aerated liquid, and then returning the aerated liquid by gravity to said main body for further fermentation.

2. In a process of treating fermenting liquids, the steps of establishing a main body of fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, and removing the gas that passes through the layer so as to prevent its participation in further circulation of the aerated liquid.

3. In a process of manufacturing yeast, the steps of establishing a main body of yeast propagating fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, removing the gas that passes through the layer so as to prevent its participation in further circulation of the aerated liquid, and returning the aerated portion of liquid to said main body for further yeast propagating fermentation.

4. In a process of treating fermenting liquids, the steps of establishing a main body of fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, removing the gas that passes through the layer so as to prevent its participation in further circulation of the aerated liquid, and varying the depth of said liquid layer at various stages during the fermentation while maintaining the supply of said gas substantially constant, the variations in depth of said liquid layer being such that the ratio between the amount of gas supplied and the amount of liquid being aerated varies in accordance with the rate of fermentation.

5. In a process of treating fermenting liquids, the steps of establishing a main body of fermenting liquid, continuously removing a portion of said liquid from the main body and forming it into a layer of materially less depth than that of said main body, regulating the quantity of the liquid forming said layer so that the depth of said layer is varied between 2 and 20 centimeters at various stages of the fermentation process, and aerating said removed portion by passing an oxygen-containing gas through said layer in a plurality of finely divided streams, whereby oxygen is taken up by the liquid from said gas, the supply of said gas being maintained substantially constant during the variations in the depth of said liquid layer, the variations in depth of said liquid layer being such that the ratio between the amount of gas supplied and the amount of liquid being aerated varies in accordance with the rate of fermentation.

6. In a process of manufacturing yeast, the steps of establishing a main body of yeast propagating fermenting liquid, continuously removing a portion of said liquid from the main body and forming it into a layer of materially less depth than that of said main body, regulating the quantity of the liquid forming said layer so that the depth of said layer is varied between 2 and 20 centimeters at various stages of the fermentation process, aerating said removed portion by passing an oxygen-containing gas through said layer in a plurality of finely divided streams, whereby oxygen is taken up by the liquid from said gas, the supply of said gas being maintained substantially constant during the variations in the depth of said liquid layer, the variations in depth of said liquid layer being such that the ratio between the amount of gas supplied and the amount of liquid being aerated varies in accordance with the rate of yeast propagation, removing the gas that passes through the layer so as to prevent its participation in further circulation of the aerated liquid, and returning the aerated portion of liquid to said main body for further yeast propagating fermentation.

7. In a process of treating fermenting liquids, the steps of establishing a main body of fermenting liquid, continuously removing a portion of said liquid from the main body and forming it into a layer of materially less depth than that of the main body, and aerating said removed portion by passing an oxygen-containing gas through said layer in a plurality of finely divided streams, each stream having a cross sectional area of at least 0.8 square millimeter, whereby oxygen is taken up by the liquid from said gas without the formation of excessive foam.

8. In a process of treating fermenting liquids, the steps of establishing a main body of fermenting liquid, continuously removing a portion of said liquid from the main body and forming it into a layer of materially less depth than that of the main body, and aerating said removed portion by passing an oxygen-containing gas through said layer in a plurality of finely divided streams, each stream having a width of at least 0.5 millimeter and a cross sectional area of at least 0.8 square millimeter, whereby oxygen is taken up by the liquid from said gas without the formation of excessive foam.

9. In a process of manufacturing yeast, the steps of establishing a main body of yeast propagating fermenting liquid, continuously removing a portion of said liquid from the main body and forming it into a layer of materially less depth than that of said main body, adding a nutrient solution to said portion of liquid subsequent to its removal from the main body of liquid and prior to its formation into said layer, aerating said removed portion by passing an oxygen-containing gas through said layer in a plurality of finely divided streams, whereby oxygen is taken up by the liquid from said gas, removing the gas that passes through the layer so as to prevent its participation in further circulation of the aerated liquid, and returning the aerated portion of liquid to said main body for further yeast propagating fermentation.

10. In a process of manufacturing yeast, the steps of establishing a main body of yeast propagating fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, removing the gas that passes through the layer so as to prevent its participation in further circulation of the aerated liquid, returning the aerated portion of liquid to said main body for further yeast propagating fermentation, and continuously stirring said main body of liquid.

11. In a process of treating fermenting liquids which includes the circulation of said liquid from a fermentation vessel through an aerating device, the steps of forming the liquid for passage through said aerating device into a relatively shallow layer of materially less depth than that normally maintained in the fermentation vessel, forcing air through said layer in finely divided streams, whereby oxygen is taken up by said liquid from the air, and leading the air passing through said layer off from the aerating device independently of the liquid so that said air does not participate in the further circulation of said liquid.

12. In a process of treating fermenting liquids which includes the circulation of a fermenting liquid from a fermentation vessel through an aerating device, the steps of forming the liquid for passage through said aerating device into a relatively shallow layer, varying the depth of said layer at various stages of the fermentation process but always maintaining said depth materially less than that normally maintained in the fermentation vessel, and forcing air through said layer in finely divided streams, whereby oxygen is taken up by said liquid from the air, the supply of air being maintained substantially constant during the variations in the depth of said liquid layer, the variations in depth of said liquid layer being such that the ratio between the amount of air supplied and the amount of liquid being aerated varies in accordance with the rate of fermentation.

13. In a process of manufacturing yeast which includes the circulation of the yeast propagating and fermenting liquid in a closed cycle from a fermentation vessel through an aerating device and back to said vessel, the steps of forming the liquid for passage through said aerating device into a relatively shallow layer, varying the depth of said layer at various stages of the fermentation process but always maintaining said depth materially less than that normally maintained in the fermentation vessel, forcing air through said layer in finely divided streams, whereby oxygen is taken up by said liquid from the air, the supply of air being maintained substantially constant during the variations in the depth of said liquid layer, the variations in depth of said liquid layer being such that the ratio between the amount of air supplied and the amount of liquid being aerated varies in accordance with the rate of yeast propagation, and leading the air passing through said layer off from the aerating device independently of the liquid so that said air does not participate in the further circulation of said liquid.

14. In a process of treating fermenting liquids, the steps of establishing a main body of fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, and varying the ratio between the amount of liquid in said layer and the amount of gas supplied thereto in proportion to the variations in the need of the main body of fermenting liquid for oxygen for the fermentation process.

15. In a process of treating fermenting liquids, the steps of establishing a main body of fermenting liquid, continuously removing a portion of said liquid from the main body and forming it into a layer of materially less depth than that of said main body, aerating said removed portion by passing an oxygen-containing gas through said layer in a plurality of finely divided streams, whereby oxygen is taken up by the liquid from said gas, and varying the quantity of liquid forming said layer while maintaining the supply of said gas substantially constant in such a manner that the ratio between the quantity of liquid in said layer and the quantity of gas supplied thereto is varied in accordance with the need of the main body of fermenting liquid for oxygen for the fermentation process.

KARL ALEXANDER WESSBLAD.
HANS ELIS ABRAHAM GÖTH.
JOHAN OLOF NAUCLER.